US006403884B1

(12) United States Patent
Lange

(10) Patent No.: US 6,403,884 B1
(45) Date of Patent: Jun. 11, 2002

(54) CABLE TERMINAL OF JOINT FOR ELECTRICAL CONNECTION OF AT LEAST ONE CABLE TO AN ELECTRICAL DEVICE

(75) Inventor: Ralf Lange, Horn-Bad Meinberg (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 09/695,415

(22) Filed: Oct. 25, 2000

(30) Foreign Application Priority Data

Oct. 25, 1999 (DE) ........................................ 199 51 455

(51) Int. Cl.[7] ................................................ H02G 3/18

(52) U.S. Cl. ................................ 174/65 SS; 174/65 R

(58) Field of Search .......................... 174/65 SS, 65 R, 174/74 A, 84 C, 93, 73.1, 17 VA, 17 CT, 51; 285/256, 257, 319, 322, 323, 331; 403/326, 329; 439/411, 412, 413, 414, 404

(56) References Cited

U.S. PATENT DOCUMENTS

| | | | | | |
|---|---|---|---|---|---|
| 3,397,379 | A | * | 8/1968 | Puig | 439/414 |
| 4,169,967 | A | * | 10/1979 | Bachle | 174/65 SS |
| 4,600,803 | A | * | 7/1986 | Holzmann | 174/65 SS |
| 4,686,738 | A | * | 8/1987 | Bladh | 174/65 SS |
| 4,787,657 | A | * | 11/1988 | Henniger | 174/65 SS |
| 4,930,815 | A | * | 6/1990 | Tuggler, Jr. | 285/331 |
| 4,969,839 | A | | 11/1990 | Nilsson | |
| 5,192,219 | A | | 3/1993 | Fowler et al. | |

(List continued on next page.)

FOREIGN PATENT DOCUMENTS

| | | |
|---|---|---|
| DE | 295 12 585 | 11/1995 |
| DE | 692 01 905 | 12/1995 |
| WO | WO 97/06580 | 2/1997 |

OTHER PUBLICATIONS

Phoenix Contact GmbH & Co. "Quickon Q 1,5 . . . ""Quick Connect Technology" Parts Catalog 2(Mar. 1997), pp. 2–7.

*Primary Examiner*—Dean A. Reichard
*Assistant Examiner*—Angel R. Estrada
(74) *Attorney, Agent, or Firm*—Nixon Peabody LLP; David S. Safran

(57) ABSTRACT

A cable terminal or joint for electrically conductive connection of a preferably multi-core cable to an electrical device, or for electrically conductive connection of two preferably multi-core cables, with one cable terminal component (2) and with a device terminal component (3), or with a first cable joint component and a second cable joint component, the cable terminal component (2) and the first cable joint component or the device terminal component (3) or the second cable joint component including a union nut (4), a wire receiving and guide part (5) which has a plurality of wire guide channels, a clamping and terminal unit (6) which is provided with insulation piercing connecting devices and with terminal elements, and a sleeve-like terminal body (9) or connecting body which is provided with an outside thread (8) which corresponds to the inside thread (7) of the union nut (4), the wire ends which are to be squeezed by the insulation piercing connecting devices or which are to make contact with the insulation piercing connecting devices (6) and the assigned insulation piercing connecting devices each running at an angle less than 180° and the insulation piercing connecting devices (6) cutting the wire insulation of the wire ends and making contact with the conductors when the union nut (4) is screwed onto the terminal body (9) or the connecting body or when the terminal body (9) or the connecting body is screwed into the union nut (4). In order to be able to ensure simple loosening of a terminal or a connection, it is provided that the wire receiving and guide part (5) is axially fixed in the union nut (4) via at least one slotted, elastic locking ring (12) and that the wire receiving and guide part (5) can be turned in the axially fixed position relative to the union nut (4).

9 Claims, 10 Drawing Sheets

U.S. PATENT DOCUMENTS 5,350,204 A * 9/1994 Henniger ................ 174/65 SS
5,600,094 A * 2/1997 McCabe ................. 174/65 SS
5,691,505 A * 11/1997 Norris ......................... 174/51
5,920,035 A * 7/1999 Haney et al. ........... 174/65 SS
5,947,532 A * 9/1999 Lorenz ....................... 285/323
5,989,056 A 11/1999 Lange et al.

* cited by examiner

CABLE TERMINAL OF JOINT FOR ELECTRICAL CONNECTION OF AT LEAST ONE CABLE TO AN ELECTRICAL DEVICE

BACKGROUND OF THE INVENTION

1. Field of the Invention

The invention relates to a cable terminal or joint for electrically conductive connection of a preferably multi-core cable to an electrical device, or for electrically conductive connection of two preferably multi-core cables, with a cable terminal component and with a device terminal component or with the first cable joint component and a second cable joint component. In particular, the cable terminal component and the first cable joint component or the device terminal component or the second cable joint component include a union nut, a wire receiving and guiding part which has a plurality of wire guide channels, a clamping and terminal unit which is provided with insulation piercing connecting devices and with terminal elements, and a sleeve-like terminal body or connecting body which is provided with an outside thread which corresponds to the inside thread of the union nut, the wire ends which are to be squeezed by the insulation piercing connecting devices or which are to make contact with the insulation piercing connecting devices and the assigned insulation piercing connecting devices each running at an angle of less than 180° and the insulation piercing connecting devices cutting through the wire insulation of the wire ends and making contact with the conductors when the union nut is screwed onto the terminal body or the connecting body or when the terminal body or the connecting body is screwed into the union nut.

2. Description of Related Art

First of all, the meaning to be given to certain terms used in the following description are to have the following meanings:

a) The term cable stands for an electrical line which has at least one wire, but generally several wires, the cable being a multi-core cable if there are several wires, the totality of which is surrounded by electrical insulation; and b) The wires of a cable mean an electrical conductor with wire insulation thereon.

It was also stated initially that the cable terminal is intended for electrically conductive connection of a cable to an electrical device. Here, an electrical device should be understood quite generally; in particular, the expression electrical device will also include electrical components, means and devices.

In terms of its basic structure, the cable terminal or joint means under consideration consists of a cable terminal component and a device terminal component, or of a first cable joint component and a second cable joint component. If it is a cable terminal, this includes a cable terminal component and a device terminal component. If it is a cable terminal joint, this includes a first cable joint component and a second cable joint component.

It was further stated initially that for the cable terminal or joint under consideration, the cable terminal component or the first cable joint component or the device terminal component or the second cable joint component includes the following a union nut, a wire receiving and guide part, a clamping and terminal unit which is provided with insulation piercing connecting devices and with terminal elements and a sleeve-shaped terminal or connection body which is provided with an outside thread which corresponds to the inside thread of the union nut.

Thus, first of all, it is intentionally left open which of the individual parts, i.e., union nut, wire receiving and guide part, clamping and terminal unit and terminal or connecting body belong to the cable terminal component or the first cable joint component or to the device terminal component or the second cable joint component. In this respect it should be added:

that the union nut generally belongs to the cable terminal component or the first cable joint component, but also an embodiment is conceivable in which the union nut includes the device terminal component and the second cable joint component, that the wire receiving and guide part belongs to the cable terminal component or the first cable joint component, that the clamping and terminal unit belongs to the device terminal component or the second cable joint component and that the terminal or connection body generally belongs to the device terminal component and the second cable joint component, but also an embodiment is conceivable in which the terminal or connection body belongs to the cable terminal component or the first cable joint component, specifically especially when the union nut belongs to the device terminal component or the second cable joint component as is described below as one possible embodiment.

It was further stated at the beginning that the wire ends which are to be squeezed by the insulation piercing connecting devices or which are to make contact with the insulation piercing connecting devices and the assigned insulation piercing connecting devices run at an angle of less than 180°. This means, first of all, only that the wire ends and the assigned insulation piercing connecting devices do not run parallel to one another, because then the insulation piercing connecting devices cannot act on the wire ends in the proper manner. The angle between the wire ends which are to be squeezed by the insulation piercing connecting devices and which are to make contact with the insulation piercing connecting devices and the assigned insulation piercing connecting devices can be both an acute and also a right angle; nor is an obtuse angle precluded. Accordingly, the wire guide channels, which hold the wire ends and which are provided in the wire receiving and guide part, are angled relative to the insertion direction of the cable. However, in order to ensure simple deflection of the wire ends during insertion, the angle should be less than 90°.

Finally, it was stated initially that when the union nut is screwed onto the terminal or connecting body or when the terminal or connecting body is screwed into the union nut, the insulation piercing connecting devices cut the wire insulation of the wire ends and make contact with the conductors. Screwing the union nut onto the terminal or connecting body, or screwing the terminal or connecting body into the union nut, leads to relative motion between the wire receiving and guide part and the clamping and terminal unit, and thus, to relative motion between the wire ends and the insulation piercing connecting devices. This relative motion leads to the insulation piercing connecting devices cutting through the wire insulation of the wire ends and then making contact with the conductors.

If, for better understanding, but in no way restrictively, the cable terminal or joint under consideration is reduced to a cable terminal with preferred assignment of the individual components to the cable terminal component, on the one hand, and the device terminal component on the other, it is therefore a cable terminal for electrically conductive connection of a preferably multi-core cable to an electrical device, with one cable terminal component and with one device terminal component, the cable terminal component including a union nut and a wire receiving and guide part and the device terminal component including a clamping and terminal unit which is provided with insulation piercing connecting devices and with terminal components, and a sleeve-shaped outside terminal body which is provided with an outside thread which corresponds to the inside thread of the union nut, the wire ends which are to be squeezed by the insulation piercing connecting devices or to make contact with the insulation piercing connecting devices and the assigned insulation piercing connecting devices running at an angle of less than 180°, and when the union nut is screwed onto the terminal body, the insulation piercing connecting devices cutting through the wire insulation of the wire ends and making contact with the conductors.

The aforementioned individual parts, the wire receiving and guide part, the clamping and terminal unit and the terminal or connecting body will now be explained. The following explanation of these individual parts relates to the above addressed cable terminal in which then the terminal or connecting body is called only the terminal body.

The wire receiving and guide part which belongs to the cable terminal component is conventionally provided on the cable side with a receiving or insertion opening for the totality of all wires or with a number of receiving or insertion openings which corresponds to the number of wires for the individual wires. Moreover, the wire receiving and guide part on the cable side is provided with the aforementioned wire guide channels. If the wire receiving and guide part on the cable side has only one receiving or insertion opening, this receiving or insertion opening then branches into the individual wire guide channels. However, on the cable side, a number of receiving or insertion openings which corresponds to the number of wires to be inserted is implemented, the individual receiving or insertion openings pass into the wire guide channels.

The wire guide channels which are implemented in the wire receiving and guide part are configured and guided with consideration of the geometry and the arrangement of the insulation piercing connecting devices of the clamping and terminal unit such that the wire ends which are to be squeezed by the insulation piercing connecting devices and which are to make contact with the insulation piercing connecting devices and the assigned insulation piercing connecting devices run at the desired angle, for example, at an acute angle or at a right angle.

The clamping and terminal unit which belongs to the device terminal component is provided on the side facing the wire receiving and guide part with insulation piercing connecting devices, on the other side with terminal components. They are metal parts which are generally made in one piece and which are configured on one side as insulation piercing connecting devices and on the other as terminal elements. The execution and configuration of the terminal components depends on which type of connection is desired or available for the internal wiring of the corresponding electrical device. In particular the terminal components can be made as flat connector, wire wrap or as solder terminal components.

As in the cable terminal under consideration, the union nut and the wire receiving and guide part represent the two important functioning elements of the cable terminal component, the sleeve-shaped terminal body which is provided with an outside thread which corresponds to the inside thread of the union nut and the clamping and terminal unit which is provided with insulation piercing connecting devices and with terminal components form the two important functional components of the device terminal component. When screwed together, i.e., when the union nut is screwed onto the terminal body, the union nut and the terminal body form a closed housing which holds and surrounds the inner function elements, specifically the wire receiving and guide part and the clamping and terminal unit.

German utility model 295 12 585, the essentially equivalent PCT patent disclosure document WO 97/06.580 and U.S. Pat. No. 5,989,056 which resulted therefrom, the company pamphlet from Phoenix Contact GmbH & Co "QUICKON Q 1,5". . . , "Quick connect technology" parts catalog 2 (March 1997) disclose another cable terminal or joint means.

In the known cable terminal or joint means the union nut and the wire receiving and guide part are two individual parts which are not connected to one another. Nor is a connection allowable because when the union nut is screwed onto the terminal or connecting body the wire receiving and guide part may not turn or cannot turn. The unimplemented connection has the consequence that, when the terminal or connection is unscrewed again, after unscrewing the union nut from the terminal or connecting body, first of all, the cable remains connected or joined, because the insulation piercing connecting devices of the clamping and terminal unit are still "fixing" the clamped conductors. Therefore, to unscrew the terminal or the connection again, after unscrewing the union nut from the terminal or connecting body, additional loosening of the conductors held by the insulation piercing connecting devices is required.

SUMMARY OF THE INVENTION

It is stated initially that the invention relates to a cable terminal or joint for electrically conductive connection of a cable to an electrical device or for electrically conductive connection of two cables. If it is a matter of connecting one cable to an electrical device, it is a cable terminal; if two cables are to be connected to one another, it is a cable joint. In the following, most of the time, the focus is on a cable terminal. But, nevertheless, a cable joint is always intended in the above explained sense.

The known cable terminal or joint means which was described above in particular and which represents a fundamentally new quick connection technology has already proven itself to be extraordinarily successful in practice. Nevertheless, in various respects, improvements, embodiments and developments are shown, which comprise the teaching of the invention.

The initially described cable terminal or joint by which the aforementioned problem is solved is characterized, first of all, essentially in that the wire receiving and guide part is axially fixed via at least one slotted, elastic locking ring in the union nut and that the wire receiving and guide part can be turned in the axially fixed position relative to the union nut. This has the major advantage that the relative axial motion between the union nut and the terminal or connecting body which accompanies the unscrewing of the union nut from the terminal or connecting body is also relative axial motion between the wire receiving and guide part and the terminal or connecting body which necessarily leads to the conductors which were clamped before in the insulation piercing connecting device coming free. If, in the cable terminal or joint in accordance with the invention, as is also accomplished in the prior art, the clamping and terminal unit is fixed in the terminal or connecting body, then, according to the invention, there is a cable terminal or joint which functionally is comprised of only two components, specifically the cable terminal component or the first cable joint component, on the one hand, and the device terminal component or the second cable joint component, on the other.

Basically, it is also possible to axially fix the wire receiving and guide part in the union nut via a catch connection. In any case, these catch connections with catch projections and catch grooves must often be produced very complexly by injection technology. Conversely, the locking ring is a simple component which can be designed according to the respective requirements and material.

The locking ring is held in the unjoined state of the wire receiving and guide part and the union nut, preferably, on the wire receiving and guide part, then, there being a projection in the union nut for fitting behind, or a corresponding groove for engaging, the locking ring. It goes without saying that it is, of course, basically also possible to hold the locking ring on the union nut and to provide the corresponding projections or a corresponding groove on the wire receiving and guide part.

For installing the locking ring, and thus, for holding on the respective component, preferably, on the wire receiving and guide part, at least one optionally peripheral axial holding projection is used. This prevents the locking ring from falling out of its installation position during assembly.

Furthermore, it is preferable that there be a locking means for the locking ring. These locking means are used especially to keep the locking ring, which is held on the wire receiving and guide part, in the desired position when the wire receiving and guide part and the union nut are joined. In particular, the locking means have at least one radial rib on the wire receiving and guide part and at least one groove on the locking ring for engaging the rib. It goes without saying that it is also fundamentally possible to provide other means or at least one rib on the locking ring and a corresponding groove on the wire receiving and guide part.

When the wire receiving and guide part and the union nut are joined, the locking ring, which has a cross section that is not larger than the diameter of the internal thread of the union nut, must be turned to its end by the internal thread of the union nut. Here, it assumes an axial slanted position according to the pitch of the thread. The locking means, therefore the ribs which fit into the groove, provide for the obliquely positioned locking ring to be entrained during turning in.

In one especially preferred embodiment of this invention, on the end face on the terminal or connecting body, there is a projection which, in the assembled state of the cable terminal or joint, fits into the slot of the locking ring so that by further screwing of the union nut onto the terminal or connecting body, the projection in the peripheral or tangential direction acts on the clamp ring and widens it. This ultimately yields protection for the locking ring since its outside strikes the inside surface of the union nut after a corresponding widening and then can no longer be widened.

In one preferred development, on the outer peripheral surface of the locking ring and/or on one inner peripheral surface of the union nut, there are grooves, teeth or the like in the area of the locking ring. After the corresponding widening, the aforementioned surfaces interact with one another; this leads to the so-called ratchet effect which, in turn, leads to higher expenditure of force due to the higher torque during attachment and also when the union nut is unscrewed. This ultimately protects the union nut from coming unscrewed.

In the following, one embodiment of this invention is explained using the drawings.

BRIEF DESCRIPTION OF THE DRAWINGS

FIG. 8 shows a section through the union nut with the wire receiving and guide part inserted therein and with the locking ring snapped in.

DETAILED DESCRIPTION OF THE INVENTION

Figure 1:
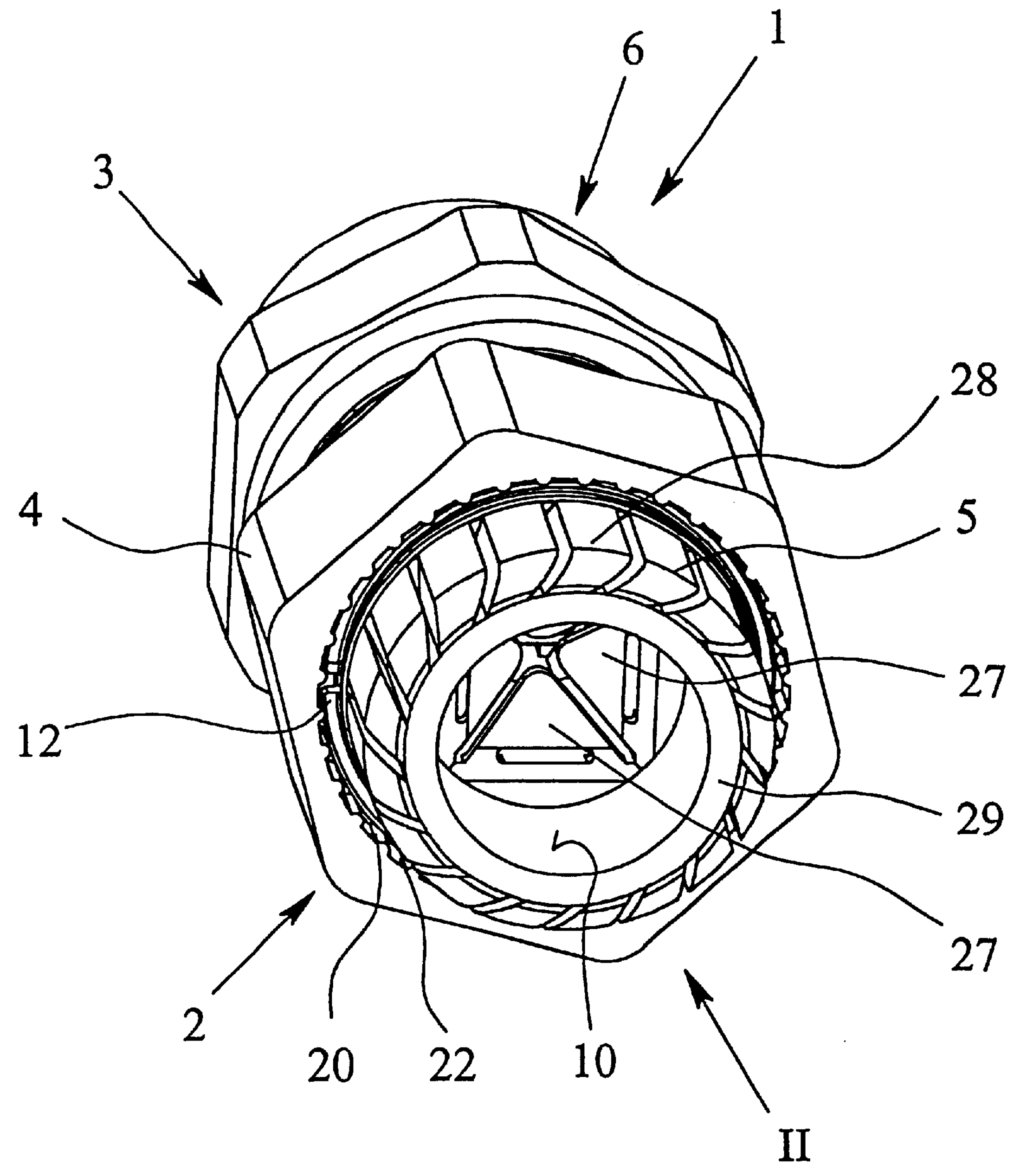
FIG. 1 is a perspective view of a cable terminal in accordance with the invention with the union nut only partially shown.

The subject matter of the invention is a cable terminal and joint for electrically conductive connection of a cable (not shown) to an electrical device (not shown) or for electrical connection of two cables (not shown). If it is a matter of connecting one cable to an electrical device, it is a cable terminal; if two cables are to be connected to one another, it is a cable joint; Hereinafter, for the sake of simplicity, the focus is always on a cable terminal 1. How the cable terminal means 1 yields a cable joint will be apparent to one skilled in the art, especially from publish International Patent Application WO 97/06.580, especially from a comparison of the cable terminal means shown in FIGS. 1 to 4 with the cable joint means shown in FIG. 5.

In terms of its basic structure, the cable terminal 1 comprises a cable terminal component 2 and a device terminal component 3. In particular, the cable terminal 1 includes a union nut 4, a wire receiving and guiding part 5, a clamping and terminal unit 6 which is provided with insulation piercing connecting devices and with terminal components, and a sleeve-shaped terminal body 9 which is provided with an external thread 8 which corresponds to the internal thread 7 of the union nut 4.

While not shown, the ends of the wires which are to be squeezed by the insulation piercing connecting devices or which are to make contact with the insulation piercing connecting devices and the respective insulation piercing connecting devices run at an angle less than 180°, specifically at an acute angle or at a right angle. When the union nut 4 is screwed onto the connecting body 9, first, the wire insulation of the wire ends is cut through; afterwards, the insulation piercing connecting devices make contact with the conductors of the individual wires.

As can be seen in the drawings, the union nut 4 and the wire receiving and guiding part 5 are part of the cable terminal component 2, while the clamping and terminal unit 6 and the terminal body 9 are part of the device terminal component 3.

The wire receiving and guiding part 5 of the cable terminal component 2 is provided on the cable side with a receiving and insertion opening 10. Moreover, the wire receiving and guiding part 5, in particular, has wire guide channels 52 for receiving the wire ends 42 of a cable 40 having insulation 41 and a conductor 43.

The clamping and terminal unit 6 of the device terminal component 3 is provided on the side facing the wire receiving and guide part 5 with insulation piercing connecting devices (not shown), and on the other side it is provided with terminal components. The insulation piercing connecting devices and the terminal components are metal parts made in one piece which have the insulation piercing connecting devices on one side and the terminal components on the other side. Reference is made to the previously published documents cited at the beginning for how the insulation piercing connecting devices work and can be made in particular; in particular reference is made to FIGS. 1 to 4 of the German utility model 295 12 585 and to FIGS. 1 to 5 of the essentially identical published International Patent Application WO 97/06.580, and furthermore, to page 2, right-hand picture, of the company pamphlet from Phoenix Contact GmbH & Co "QUICKON Q 1,5 . . . . ", "Quick connect technology" parts catalog 2 (March 1997).

Figure 2:
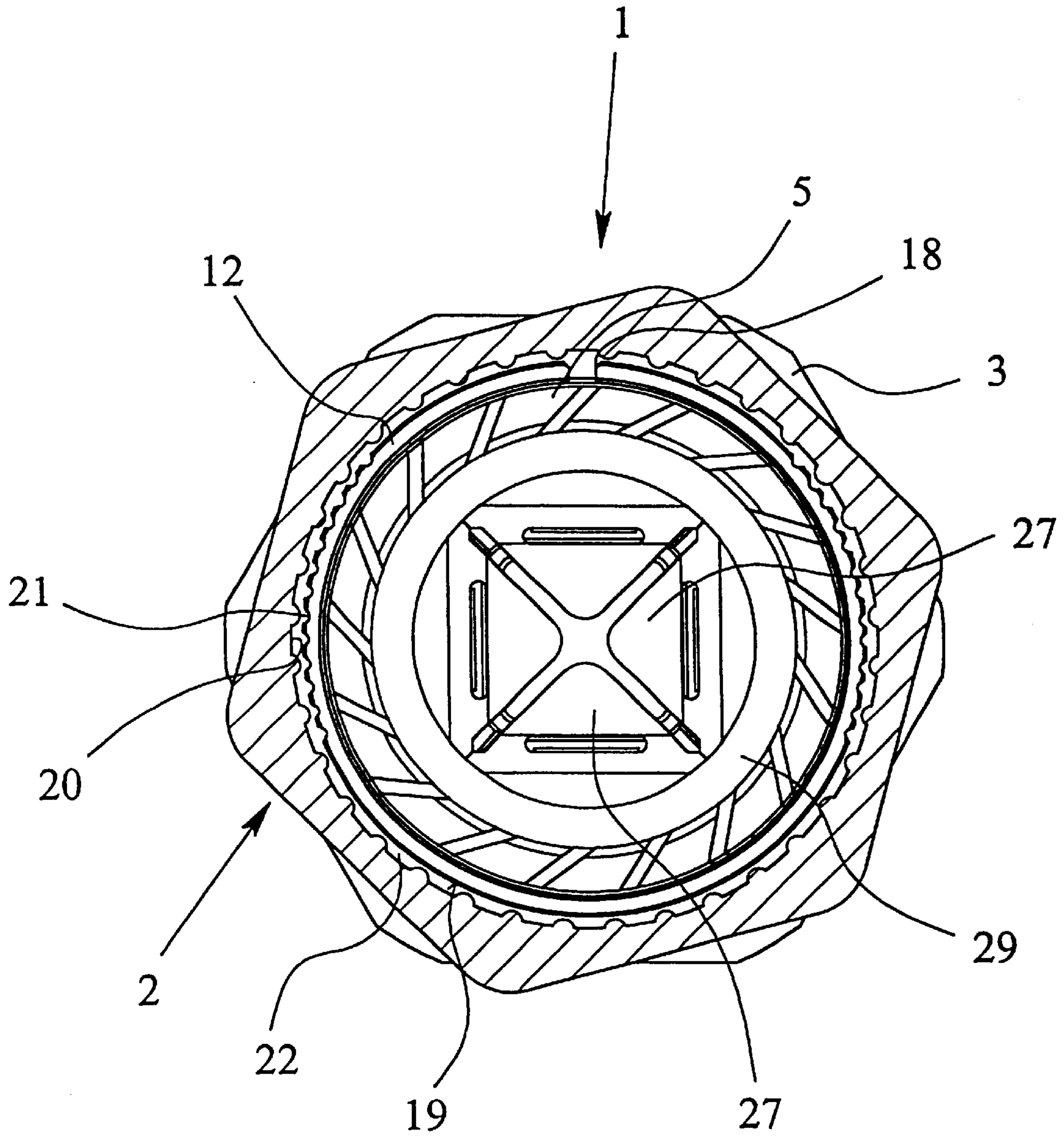
FIG. 2 is a view of the cable terminal of FIG. 1 viewed in the direction of the arrow II seen from FIG. 1.
Figure 2A:
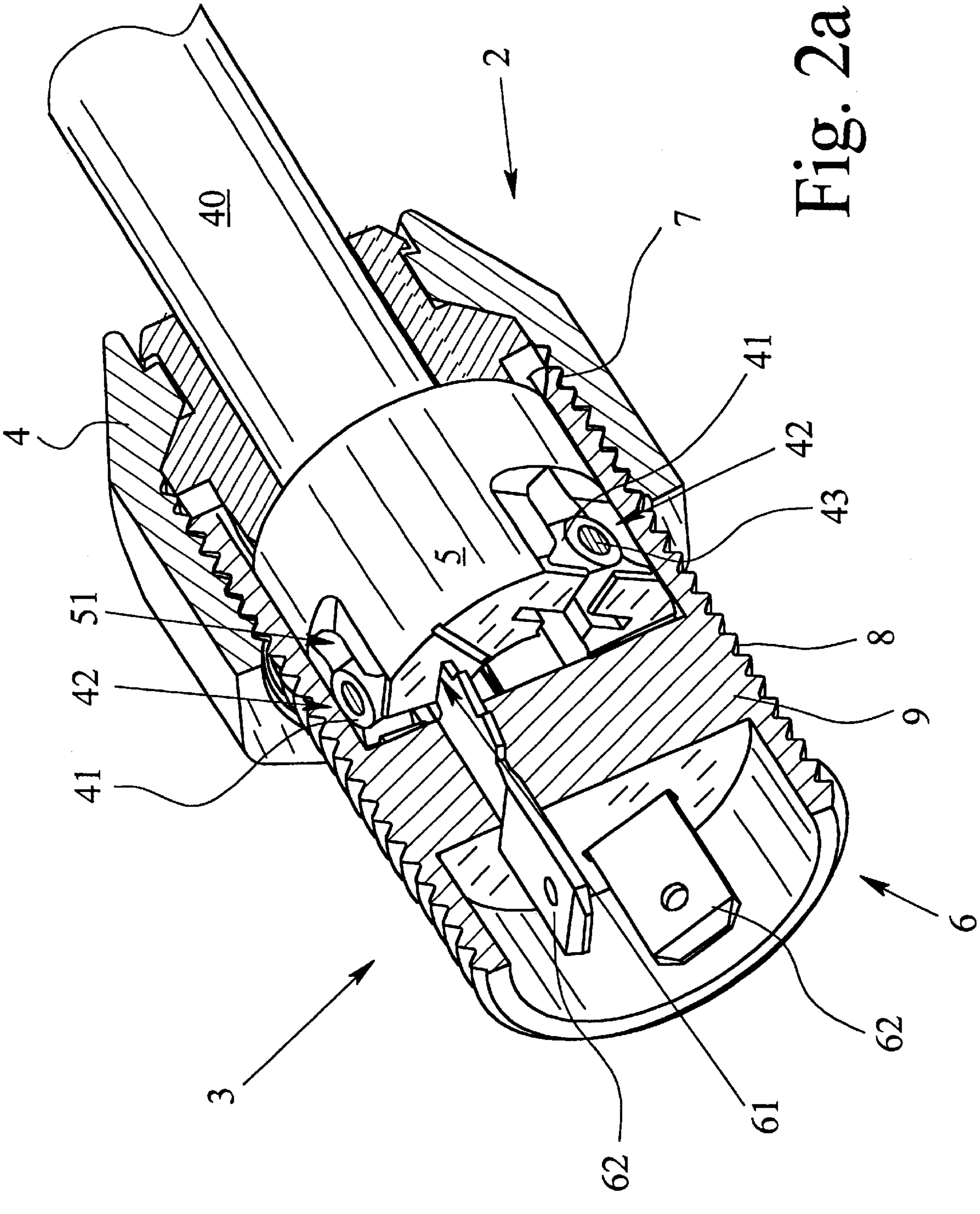
FIG. 2A is a view of the cable terminal of the invention with union nut, the wire receiving and guiding part, and clamping and terminal unit in assembled relation with a cable.

As also shown by FIGS. 1 and 2 of the German utility model 295 12 585 and PCT patent disclosure document WO 97/06.580, the wire receiving and guide part 5 is provided with notches 11 or cutting contact slots which project to the inside from the side facing the clamping and terminal unit 6, therefore, into the interior of the wire receiving and guide part 5. When the cable terminal component 2 and the device terminal component 3 are joined, therefore specifically when the union nut 4 is screwed onto the terminal body 9, the insulation piercing connecting devices of the clamping and terminal unit 6 successively penetrate into the notches 11 which are provided in the wire receiving and guide part 5, penetrate the wire insulation of the individual wires and then make contact with the individual conductors.

It is important here that the wire receiving and guide part S is axially fixed in the union nut, in this case, via at least one slotted elastic locking ring 12, and that the wire receiving and guide part 5 can be turned relative to the union nut 4 in the axially fixed position. This has the major advantage that the relative axial movement between the union nut 4 and the terminal body 9 which accompanies the unscrewing of the union nut 4 from the terminal body 9 is then also produces relative axial motion between the wire receiving and guide part 5 and the terminal body 9, which necessarily leads to the conductors which have been clamped beforehand in the insulation piercing connecting devices now coming free. Since, in the cable terminal 1 shown, the clamping and terminal unit 6 is fixed in the terminal body 9, and is an integral component of the terminal body 9, the cable terminal functionally is composed of only two components, specifically, the cable terminal component 2 and the device terminal component 3.

It should be pointed out here that the locking ring 12 can be produced fundamentally from any material which has springy-elastic properties. The shape of the locking ring 12 is not limited to round. Other shapes are also easily possible, as is the use of other retaining elements.

Figure 3:
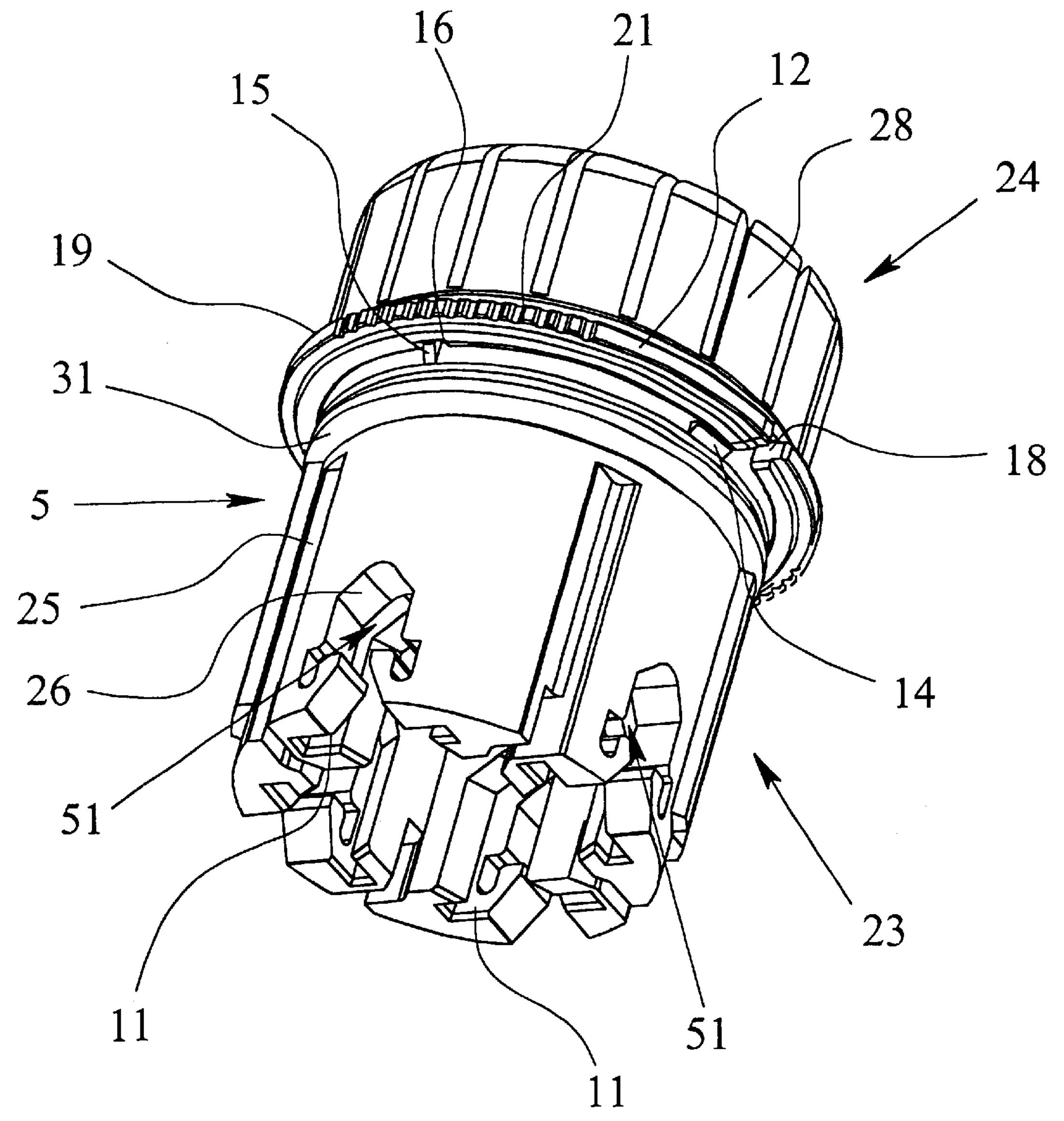
FIG. 3 is a perspective view of a wire receiving and guide part of the cable terminal according to the invention.
Figure 5:
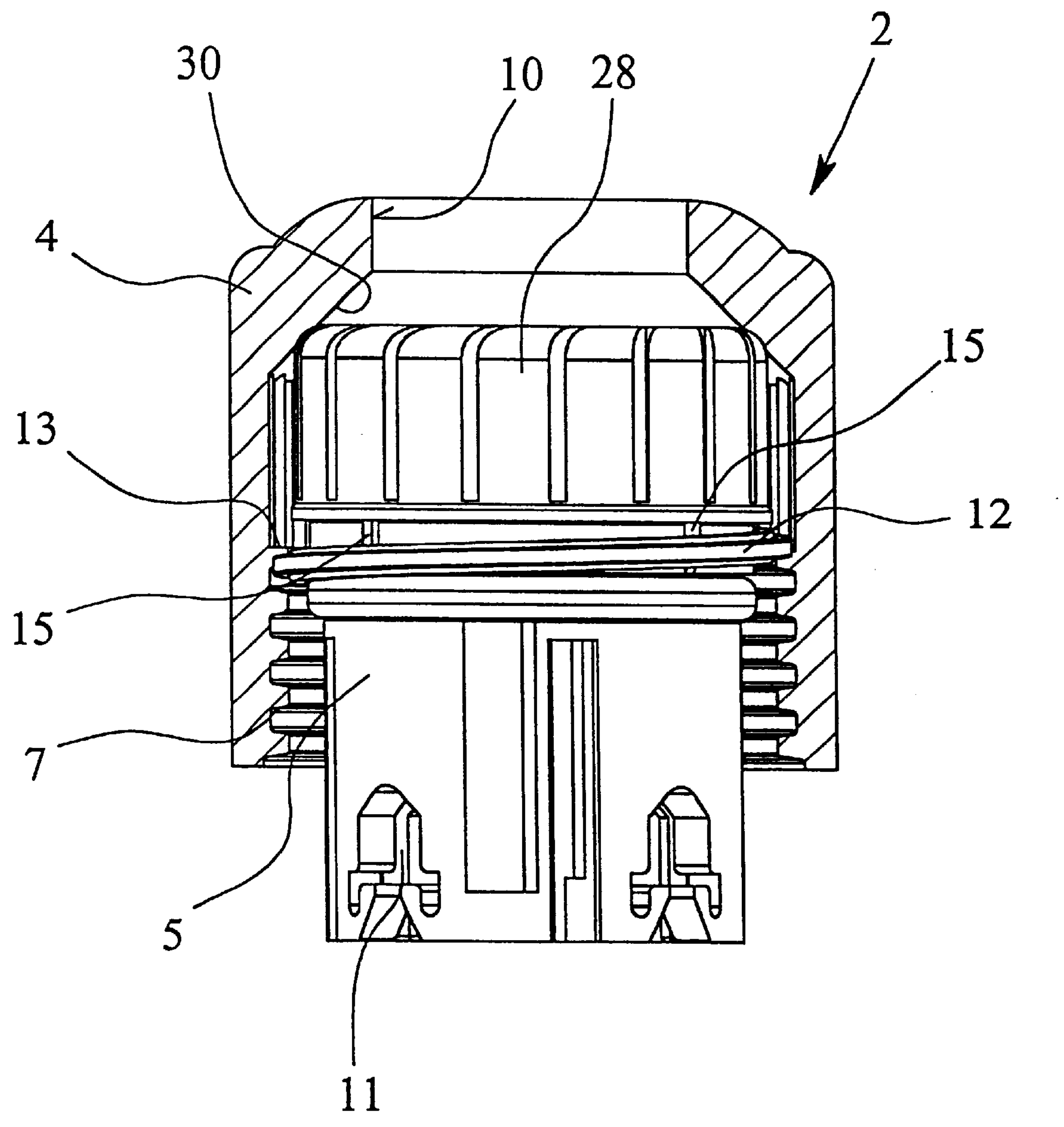
FIG. 5 is a view of a wire receiving and guide part in the process of insertion into a union nut, which is shown in cross section.
Figure 6:
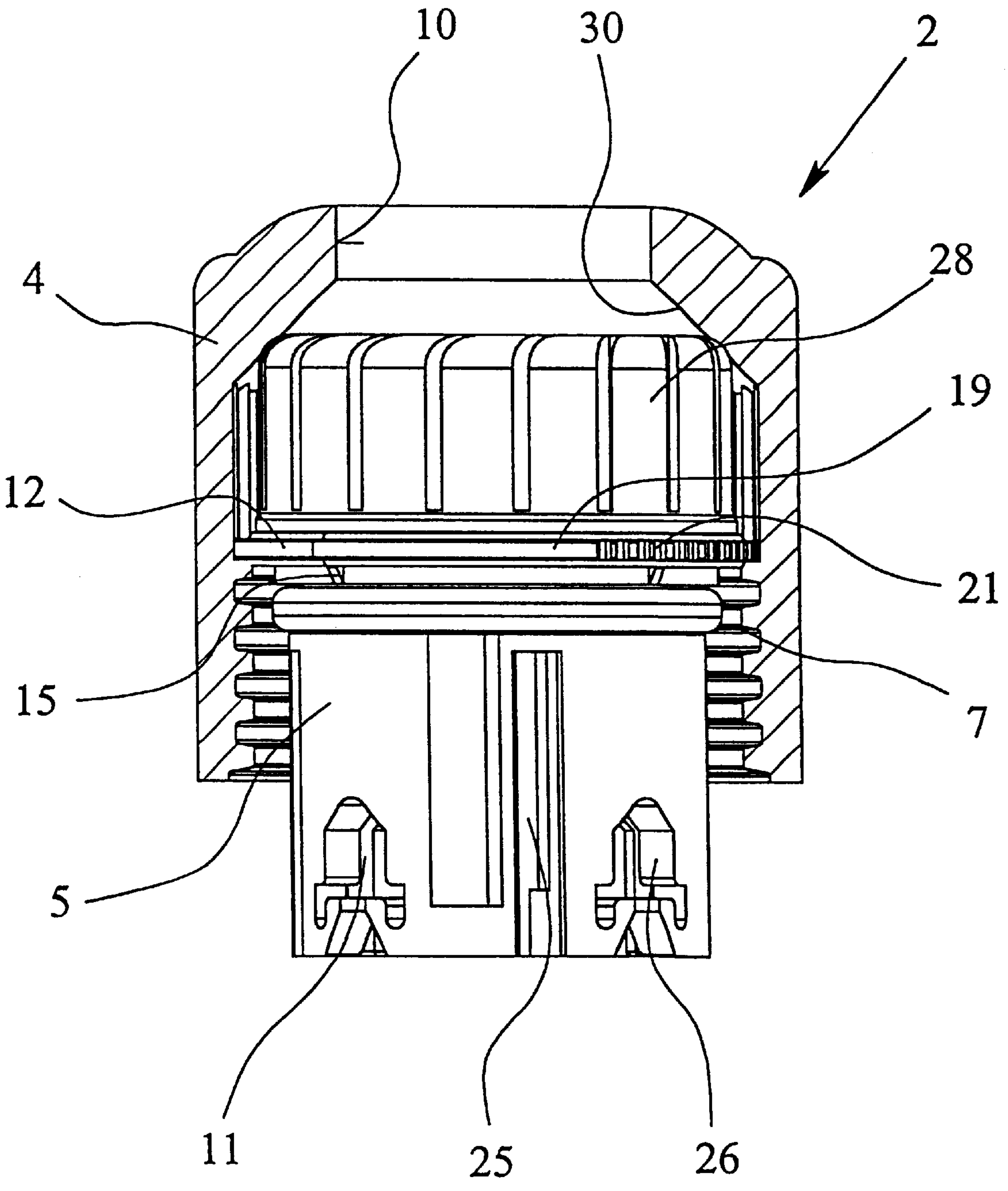
FIG. 6 is a view of a wire receiving and guide part in the state inserted into the union nut, which is shown in cross section.

For axial locking in the joined state, in the union nut 4 there is a projection 13 (FIG. 5) behind which the locking ring 12 reaches in the fixed state, as is shown in FIG. 6. As follows from FIGS. 3 & 4, in which only the wire receiving and guiding part 5 is shown, the locking ring 12, in the unjoined state, is held by the wire receiving and guiding part 5 and the union nut 4 on the wire receiving and guiding part 5. Furthermore, FIG. 3 shows that one of number of axial holding projections 14 which are provided for axial holding of the locking ring 12.

Additionally, there are locking means for the locking ring 12. In the embodiment shown, the locking means have a plurality of radial ribs 15 on the wire receiving and guiding part 5, and for each rib 15, a groove 16 is provided on the locking ring 12 for engaging the respective rib 15 (see FIG. 9). To more easily slip on the locking ring 12, the ribs 15 are provided with a feed bevel on their free end. Moreover, the individual ribs 15 have a certain length in the axial direction which is greater than the thickness of the locking ring 12. Also the width of the groove 16 is larger than the width of the associated rib 15. These dimensions make it possible to turn the wire receiving and guiding part 5, with the locking ring 12 fixed on it, into the union nut 4. When the wire receiving and guiding part 5 is turned into the union nut 4, the locking ring 12 assumes a slanted position corresponding to the pitch of the internal thread 7 of the union nut 4. The individual ribs 15 which fit into the grooves 16 provide for entrainment of the obliquely positioned locking ring 12. The oblique position of the locking ring 12 is shown in FIG. 5. If the wire receiving and guiding part 5 and the union nut 4 are completely joined, as is shown in FIG. 6, the locking ring 12 has assumed the horizontal position shown in FIG. 6, since it is no longer guided in the internal thread 7 of the union nut 4. In this state, the locking ring 12 then fits behind the projection 13. It is then inherently no longer possible to unscrew the wire receiving and guiding part 5 from the union nut 4 without tolerating damage or destruction of the locking ring 12.

Figure 7:
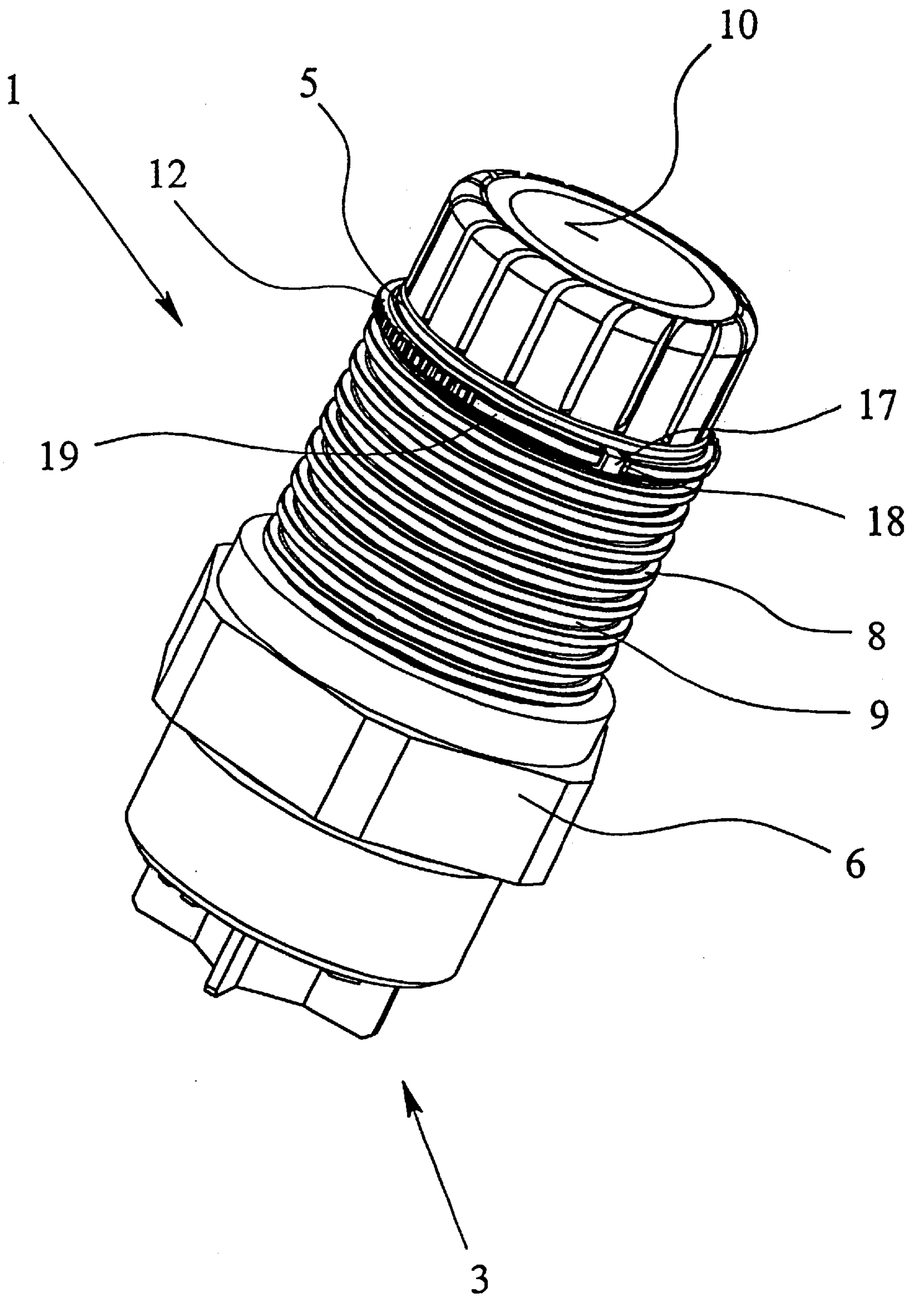
FIG. 7 is a perspective view of a wire receiving and guide part which is inserted into the terminal body of the cable terminal with the union nut omitted for the sake of clarity.
Figure 8:
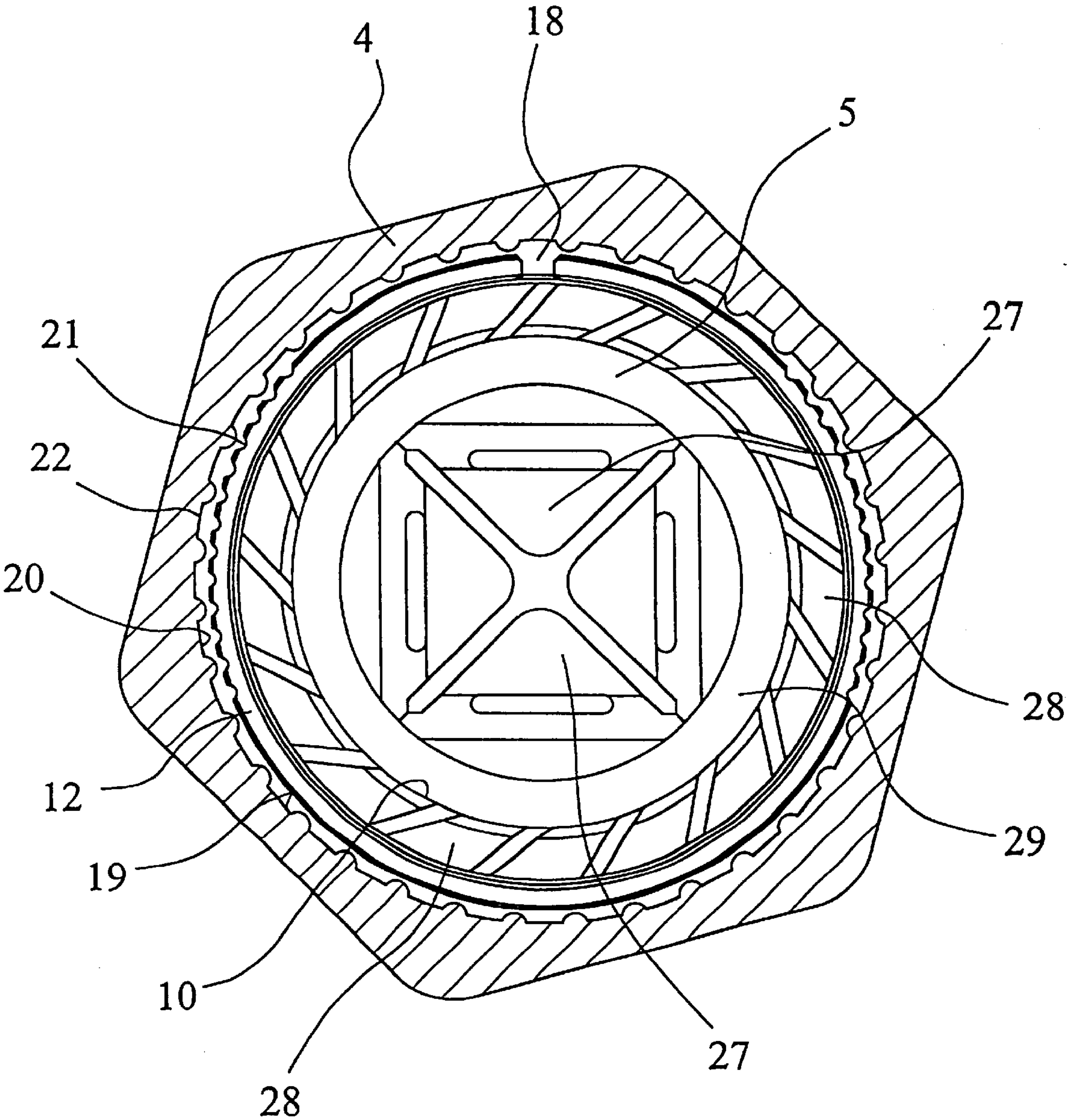
Figure 9:
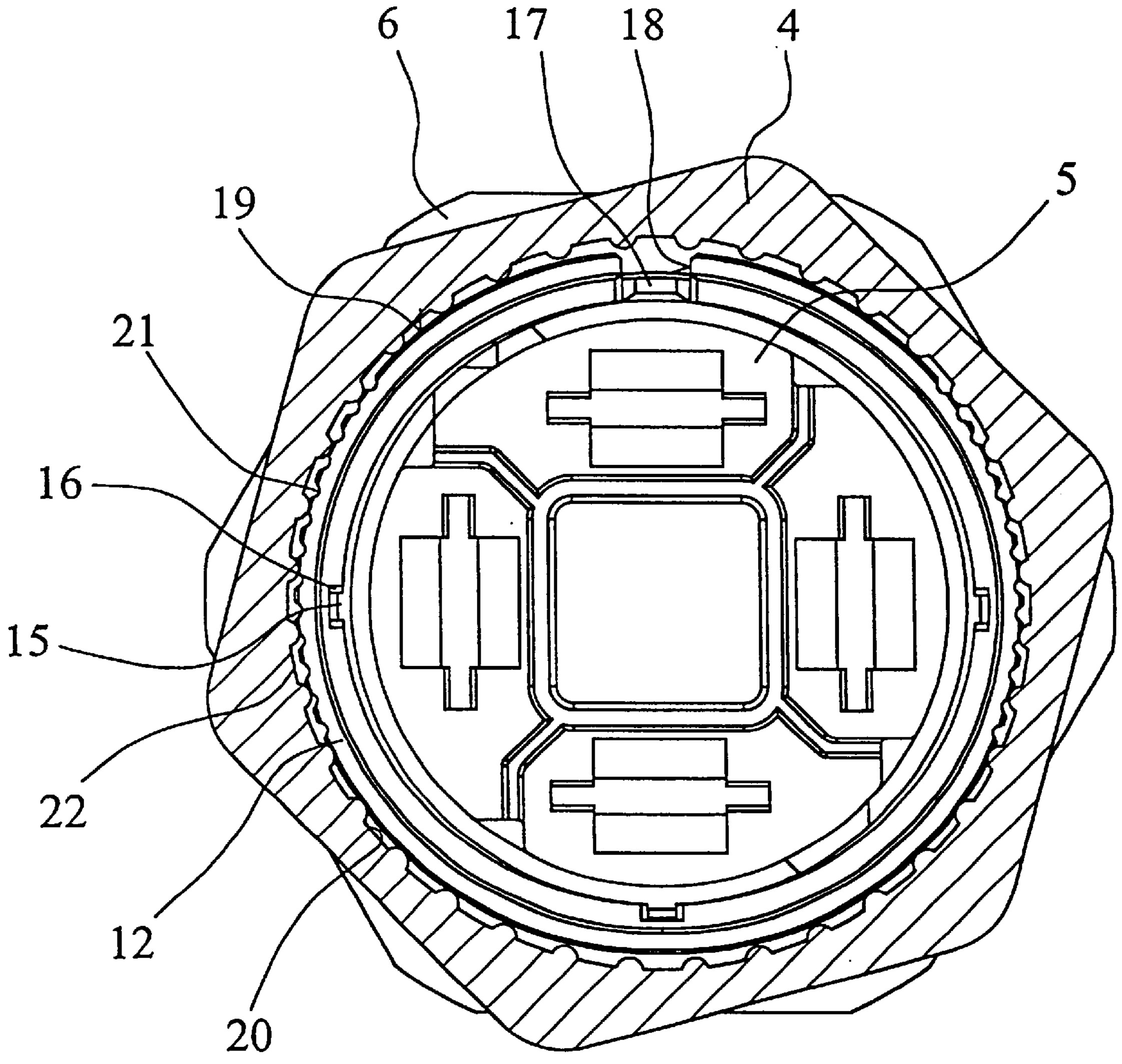
FIG. 9 shows a section through the terminal body with the cable terminal component screwed in and the locking ring spread.

As follows especially from FIG. 7, but also from FIGS. 8 and 9, on the end face of the terminal body 9, there is a projection 17. In the assembled state of the cable terminal 1, the projection 17 fits into the slot 18 of the locking ring 12 so that by further screwing-on of the union nut 4, the projection 17 acts on the locking ring 12 in the peripheral direction and expands it, as shown in FIG. 9. FIG. 8 shows the unexpanded state. Furthermore, as shown especially by FIGS. 7 to 9, on the outer peripheral surface 19 of the locking ring 12 and on the inner peripheral surface 20 of the union nut 4 as well as in the area of the locking ring 12, there are a large number of grooves 21, 22 and teeth or ribs which interact when the locking ring 12 is expanded and lead to a ratchet effect, by which, in turn, a higher expenditure of force or a higher torque results when the union nut 4 is attached and also when it is unscrewed. By means of the interaction of the peripheral surfaces 19, 20, ultimately, the locking ring 12 is protected against overexpansion, and thus, against damage or destruction.

Figure 4:
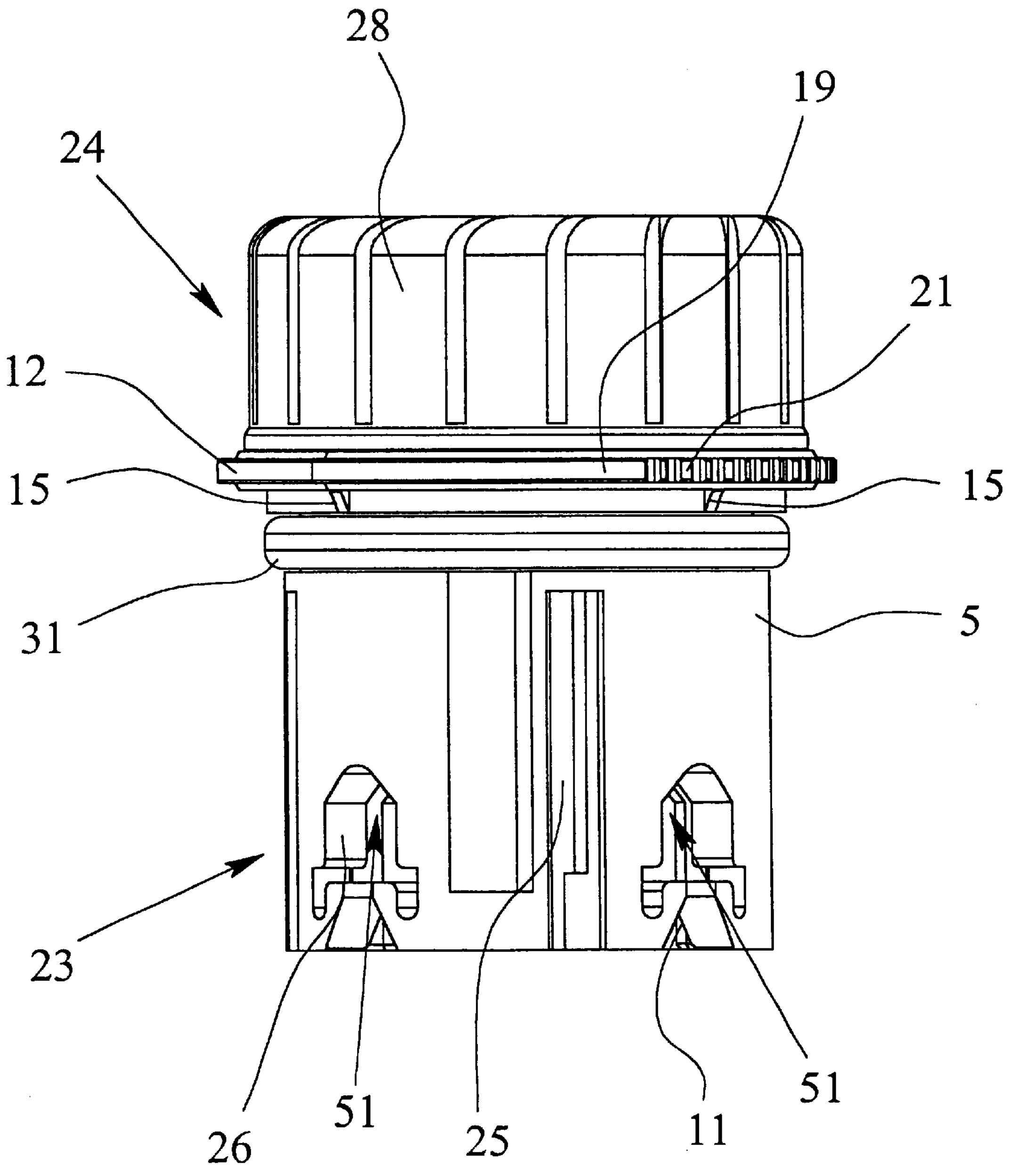
FIG. 4 is a side view of the wire receiving and guide part of FIG. 3.

As follows especially from FIGS. 3 & 4, the wire receiving and guiding part 5, itself, has two areas, specifically one wire guide area 23 and a tension relief and sealing area 24. In the wire guide are 23, there are wire guide channels 51 for the individual wires. On the bottom end face of the wire guide area 23 are the aforementioned notches 11 for the insulation piercing connecting devices 61 having terminal elements 62. On the outside, on the wire guide area 23, on the one hand, there are grooves 25 for interaction with the corresponding springs in the terminal body 9. The grooves 25, in conjunction with the springs which are not shown, are used for coding. Furthermore, on the outside, there are recesses 26 which are used as retention catches for the conductors when laid sideways. On the inside, on the transition from the wire guide area 23 to the tension relief and sealing area 24, there are a plurality of flexible tabs 27 (FIGS. 1 & 2) which can be easily adapted to different cable diameters. The tabs 27 provide for secure holding of the cable terminal component 2 or the wire receiving and guiding part 5 in the unjoined state of the cable terminal 1.

Otherwise, the tension relief and sealing area 24 has a plurality of segments 28 which are arranged in a ring shape and which adjoin a gasket 29 on the inside. The segments 28 interact with a bevel 30 provided on the inside on the union nut 4 (FIGS. 5 & 6) as a so-called Pg screw connection so that, when the union nut 4 is screwed onto the terminal body 9, the segments 28 are pressed against the gasket ring 29 and thus sealing towards the cable results. Moreover, this yields tension relief at the same time.

Finally, on the outside of the wire receiving and guiding part 5, there is a peripheral gasket 31 (FIGS. 3 & 4) which seals between the wire receiving and guiding part 5, on the one hand, and the terminal body 9 on the other.

In conjunction with the embodiment shown, details are not described which are implemented in the cable terminal means underlying the invention, but which can be implemented in the cable terminal means in accordance with the invention. To prevent embodiments superfluous in this respect, reference is made to the U.S. Pat. No. 5,989,056, German utility model 295 12 585, Published PCT Patent Application WO 97/06,580, and furthermore, the company pamphlet from Phoenix Contact GmbH & Co "QUICKON Q 1,5 . . . ", "Quick connect technology" parts catalog 2 (March 1997). The disclosure contents of these previously published documents is hereby expressly made the disclosure contents of this application.

Thus, while a single embodiment in accordance with the present invention has been shown and described, it is understood that the invention is not limited thereto, and is susceptible to numerous changes and modifications as known to those skilled in the art, so that this invention is not limited to the details shown and described herein, and includes all such changes and modifications as are encompassed by the scope of the appended claims.

What is claimed is:

1. Cable terminal or joint for making an electrically conductive connection between at least one cable joint component and at least one of an electrical device and a second cable joint component, comprising:

a first connection component; and a second connection component;

wherein one of said connection components has a union nut and a wire receiving and guiding part which has a plurality of wire guide channels, and the other of said connection components has a clamping and terminal unit which is provided with insulation piercing connecting devices and with terminal elements, and a sleeve-like body which is provided with an external thread which corresponds to an inside thread of the union nut; wherein the insulation piercing connecting devices cut wire insulation of wire ends and make contact with conductors of the wires when the union nut is screwed onto the sleeve-like body; wherein the wire receiving and guiding part is axially fixed in the union nut by means of an elastic locking ring having at least one slot; and wherein the wire receiving and guiding part is rotatable in a position axially fixed relative to the union nut.

2. Cable terminal or joint as claimed in claim 1, wherein the first connection component is first cable joint component and the second connection component is a second cable joint component.

3. Cable terminal or joint as claimed in claim 1, wherein the first connection component is a cable terminal component and the second connection component is an electrical device terminal component.

4. Cable terminal or joint as claimed in claim 1, wherein the locking ring is held on the wire receiving and guiding part when the wire receiving and guiding part and the union nut are not joined together; and wherein at least one projection is provided in the union nut for engaging the locking ring.

5. Cable terminal or joint as claimed in claim 1, wherein at least one axial holding projection is provided for axial holding of the locking ring.

6. Cable terminal or joint as claimed in claim 1, wherein a locking means is provided for the locking ring; and wherein the locking means comprises at least one radial rib on the wire receiving and guiding part and at least one groove on the locking ring for engaging the rib.

7. Cable terminal or joint as claimed in claim 6, wherein the at least one radial rib has an axial length and the at least one groove has a width such that, when the wire receiving and guiding part is threaded to the union nut which has an inside thread, the locking ring is obliquely positioned according to the pitch of the inside thread of the union nut and is entrained by the rib.

8. Cable terminal or joint means as claimed in claim 1, wherein a projection is provided on an end face of the sleeve-like body; and wherein the projection, in a joined state of the connection components, fits into the slot of the locking ring so that by screwing of the union nut onto the sleeve-like body, the projection acts to expand the locking ring.

9. Cable terminal or joint as claimed in claim 8, wherein grooves and teeth are provided on an outer peripheral surface of the locking ring and an inner peripheral surface of the union nut in the area of the locking ring.

* * * * *